(12) United States Patent
Cewers et al.

(10) Patent No.: US 6,345,540 B1
(45) Date of Patent: Feb. 12, 2002

(54) FLUID FLOW METER

(75) Inventors: Göran Cewers; Thomas Laurell; Johan Drott, all of Lund (SE)

(73) Assignee: Siemens Elema AB, Solna (SE)

(*) Notice: Subject to any disclaimer, the term of this patent is extended or adjusted under 35 U.S.C. 154(b) by 0 days.

(21) Appl. No.: 09/310,126

(22) Filed: May 12, 1999

(30) Foreign Application Priority Data

May 19, 1998 (SE) .............................................. 9801766

(51) Int. Cl.[7] ................................................. G01F 1/74
(52) U.S. Cl. .................................................. 73/861.71
(58) Field of Search ............................. 73/861.71, 726, 73/861.74, 204.18, 861.75

(56) References Cited

U.S. PATENT DOCUMENTS

| | | | |
|---|---|---|---|
| 3,989,037 A | 11/1976 | Franetzki | |
| 4,006,634 A | 2/1977 | Billette et al. | |
| 4,790,181 A | * 12/1988 | Aine | 73/204.18 |
| 5,189,918 A | 3/1993 | Etienne et al. | |
| 5,279,162 A | * 1/1994 | Takebe et al. | 73/726 |
| 5,663,508 A | * 9/1997 | Sparks | 73/861.71 |

* cited by examiner

Primary Examiner—Benjamin R. Fuller
Assistant Examiner—Jewell V. Thompson
(74) Attorney, Agent, or Firm—Schiff Hardin & Waite

(57) ABSTRACT

A fluid flow meter has a semi-conducting substrate and a number of integral flexible tines orientated across an aperture in the substrate to deflect in the direction of the fluid flow by an amount dependent on that fluid flow. Piezo-resistive regions are included on the respective tines to provide them with electrical characteristics which vary dependent on the degree of deflection. A monitor, operably coupled to the regions of the tines, is provided to monitor the changes in their electrical characteristics and to calculate the flow therefrom.

8 Claims, 2 Drawing Sheets

FLUID FLOW METER

BACKGROUND OF THE INVENTION

1. Field of the Invention

The present invention relates to a fluid flow meter and in particular to a flow meter of the type that operates by measuring changes in electrical properties of an obstruction in the fluid flow path in order to determine the fluid flow.

2. Description of the Prior Art

A known flow meter of this type has an obstruction, in the form of a rigid paddle, to which is attached a piezo-resistive rod. The paddle is arranged to be deflected by a force exerted by a flowing fluid so that it tends to twist the piezo-resistive rod. This twisting results in changes in the electrical resistance of the rod, Changes in the electrical properties (such as resistance) of electrical circuitry that includes the rod are then measured and are used to calculate the fluid flow.

One disadvantage of the known device is that, particularly when used to measure small flows, the paddle must be made relatively large in order to construct a sufficiently sensitive flow meter. This adds an appreciable and undesirable resistance to the flowing fluid. Additionally, as the mass of the paddle increases its resonant frequency decreases. This may lead to a reduction in the usefulness of the sensor in measuring oscillatory flows, since oscillatory flows with frequencies close to and above the resonant frequency cannot be easily or accurately measured using such a paddle.

Moreover, the paddle produces an "average" flow measurement from across the entire surface that faces upstream of the flow. This can lead to inaccurate measurements, especially when part of this surface lies in a region of turbulent flow.

SUMMARY OF THE INVENTION

An object of the present invention is to provide a fluid flow meter wherein at least some of the problems associated with known flow meters are alleviated.

The above object is achieved in accordance with the principles of the present invention in a fluid flow meter having a fluid flow path therein with an obstruction disposed in the fluid flow path which is deflectable in response to fluid flow, the obstruction having electrical characteristics which vary dependent on the degree of deflection, and wherein the obstruction is formed by a number of flexible tines which are oriented so as to deflect in the direction of fluid flow. A monitor is operably coupled to the obstruction so as to monitor changes in electrical characteristics caused by deflection of the tines, and to calculate the fluid flow therefrom.

By employing number of tines instead of a single, large paddle, the mass of each deflectable element is considerably reduced which enables a meter to be constructed having a faster response time and which is better suited to the measurement of oscillatory flows. Moreover, since the tines deflect in the direction of the fluid flow the resistance the sensor offers to flowing fluid decreases as the flow increases, reducing turbulence effects which may occur at higher flows.

The degree of flexion of each tine in the flowing fluid can be separately selected and can be used to provide an "average" flow value using all of the tines. Alternatively, a selective flow value can be obtained using one or more of the tines chosen, for example, because the variations in determined flexes indicates that they lie outside regions of turbulent flow, or because the tines are of differing degrees of flexibility and those most responsive at the extant flow rate are selected.

Preferably, the tines are integral with a semi-conducting substrate, such a silicon, on to which other sensors and circuitry is integrated to form a flow meter that can be accurately and reproducibly fabricated using standard etching and doping techniques well established in the field of integrated chip technology.

Most usefully, the tines may be disposed to form a variable area obstruction across an aperture in the substrate and a differential pressure sensor can be integrated with the substrate to calculate the flow rate from pressure differences measured upstream and downstream of the tines in a manner common in the art, for example in the ways described in U.S. Pat. No. 4,006,634, the disclosure of which is incorporated herein by reference. With this arrangement two flow meters, both dependent on the flexibility of the tines, are incorporated in the same device, with practically no additional space. In such an arrangement one meter can be used as a safety backup device for the other.

DESCRIPTION OF THE PREFERRED EMBODIMENTS

Figure 1:
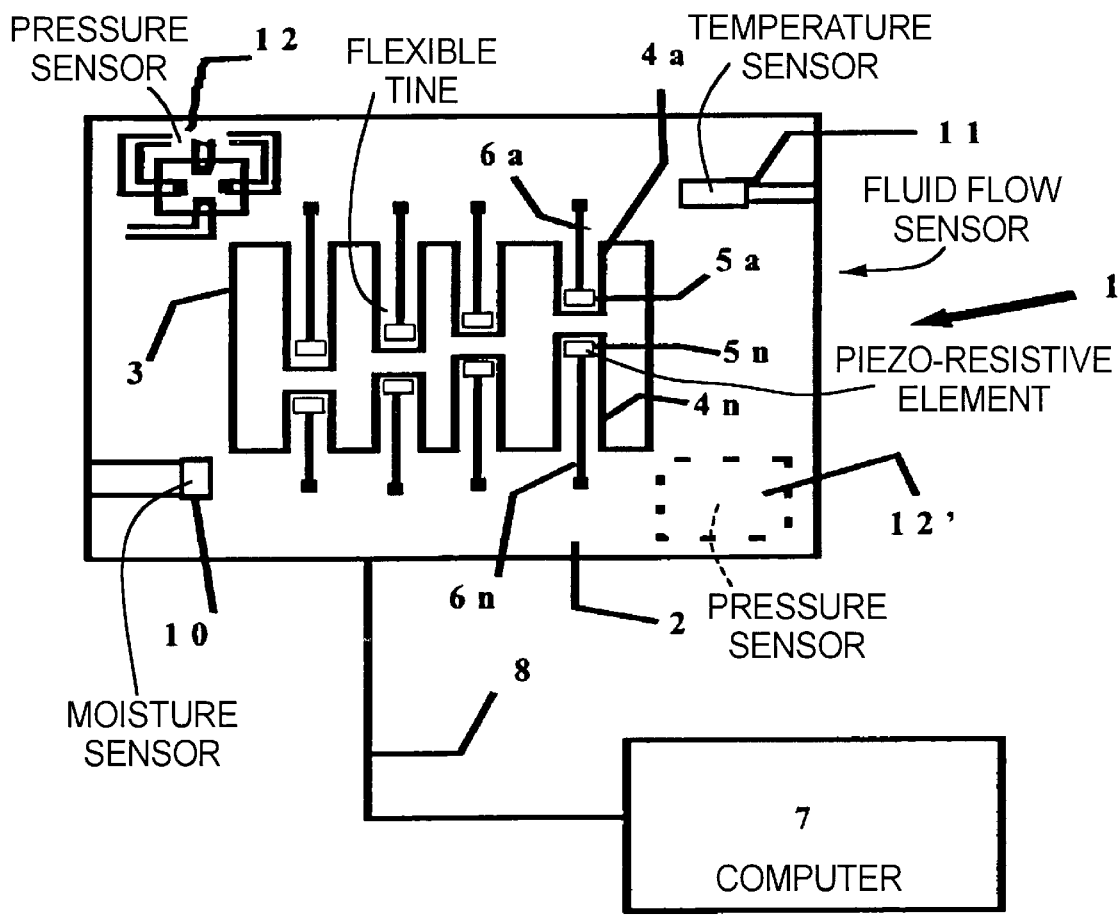
FIG. 1 is a schematic illustration of a flow meter according to the present invention.

As shown in FIG. 1, a fluid flow sensor 1 has a silicon 20 substrate 2 that is etched to provide an aperture 3 disposed in a fluid flow path through the sensor 1, across which extends a number of flexible tines 4a ... n to form a variable area obstruction to a fluid flow. The substrate 2 can be etched to leave bars of silicon extending between opposite sides of the same face of the aperture 3. The bars are then etched so that they form flexible tines 4a ... n connected to the substrate at one end only. For example the tines 4a ... n can be of different lengths as shown in FIG. 1. The lengths of the individual tines 4a ... n are selected to influence their degree of flexibility which will vary their individual responses to differing flow rates and hence increase the overall sensitivity and dynamic range of the flow meter. The tines 4a ... n are doped to produce piezo-resistive areas 5a ... n, so that their electrical properties will vary as they flex. Associated conducting paths 6a ... n connect the respective piezo-resistive areas 5a ... n to the main body of the substrate 2.

Figure 2:
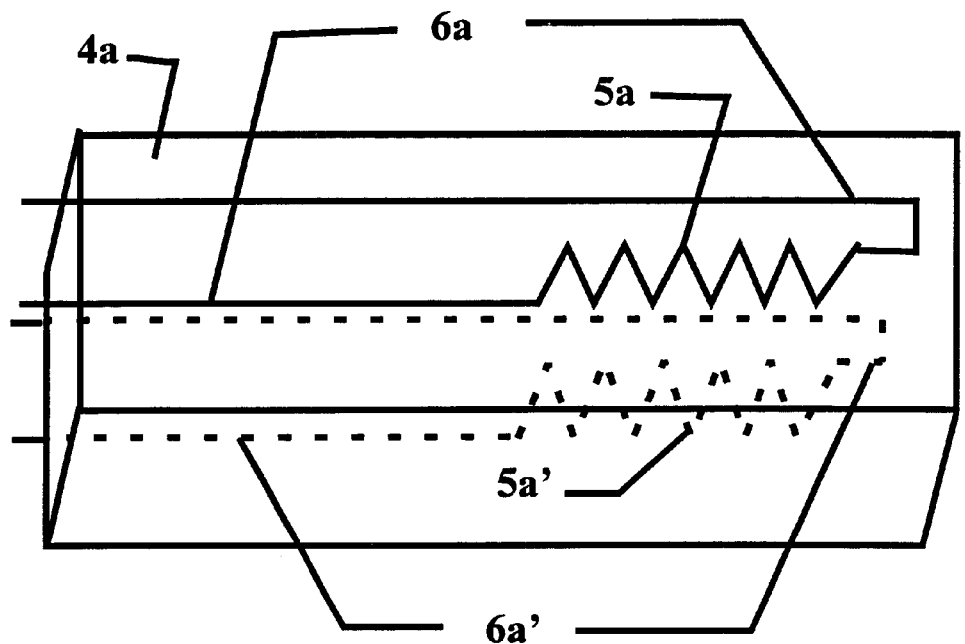
FIG. 2 shows an example of a tine of the flow meter of FIG. 1 configured with a piezo-resistive portion.

As shown in FIG. 2 for one tine 4a, the piezo-resistive area can be formed as elements 5a, 5a' opposing one another along opposite faces of the respective tine 4a. Thus, as the tine 4a flexes one piezo-resistive area, for example 5a, expands and the other, for example 5a', contracts. Since the piezo-resistive elements 5a, 5a' have piezo-resistive properties that vary substantially equally with temperature the sensor 1 is also provided with a degree of temperature stability. The areas 5a, 5a' is connected to the main body of the silicon substrate 2 via respective electrical conductors 6a, 6a', from where they are connected electrically to a suitably configured personal computer 7 (or alternatively a dedicated microprocessor), represented by the connector S in FIG. 1 in a manner common in the field of integrated circuit technology.

Figure 3:
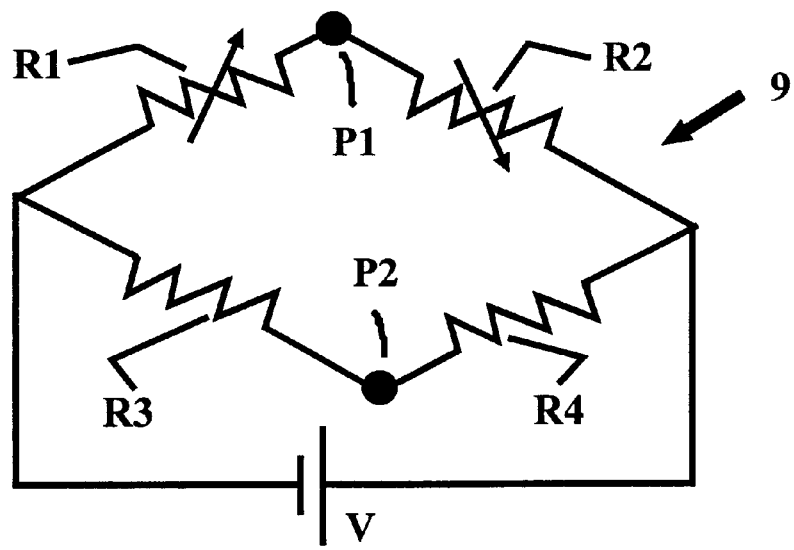
FIG. 3 is an illustration of a Wheatstone bridge 15 circuit useable with the tines shown in FIGS. 1 and 2 for the determination of the flow.

The elements 5a, 5a' are configured in an electrical circuit to act as variable resistors R1, R2 as shown in FIG. 3. The circuit may be constructed on a suitable circuit board (not shown) which may be conveniently mounted in a conventional "card slot" (such as an ISA or PCI slot)on the motherboard of the computer 7. The variable resistors R1, R2 together with the resistors R3, R4 of known resistance and the voltage source V, form a conventional Wheatstone bridge arrangement 9 as shown schematically in FIG. 3. As is known in the art, the resistors R3, R4 are chosen to provide a balanced bridge circuit 9 when the tine 4a is undeflected. The computer 7 initiates measurements of an electrical current that will flow between the points P1, P2 in the Wheatstone bridge 9 when the tine 4a flexes and the bridge circuit 9 becomes unbalanced. Alternatively, the Wheatstone bridge arrangement 9 may be housed separately from the computer 7 and a value representative of a measured current transferred to the computer 7.

This electrical current is representative of the amount of flexing of the tine 4a as a fluid flows and is used in the calculation of the flow rate by the computer 7, which can be programmed, for example, to carry out the calculation using an empirically determined mathematical relationship between the measured current and the extant fluid flow.

It will be appreciated that each of the remaining tines 4b . . . n are similarly configured with corresponding piezo-resistive areas 5b . . . n, 5b' . . . n' and conductors 6b . . . n, 6b' . . . n' and operate as described above for the tine 4a. Thus the circuit board can be provided with further Wheatstone bridge circuits, one for each tine 4b . . . n, identical to that bridge circuit 9 described above. The computer 7 can then be programmed to selectively utilize the measurements from individual tines 4a . . . n to provide a sensible output indicative of the extant fluid flow. It will be clear to those skilled in the art that such a selection will depend largely on the proposed use of the sensor 1 and the physical conditions it is expected to experience. For example a selection to use readings from just some of the tines 4a . . . n can be based on the responsiveness of individual tines 4a . . . n to a particular flow or on the flow conditions as indicated by the readings of the individual tines 4a . . . n made so as to exclude readings from those tines in regions of turbulent flow. Alternatively a selection to use the readings from all of the tines 4a . . . n may be made.

An advantage of using a semi-conducting material as the substrate 2 of the sensor 1 is also illustrated in FIG. 1 which shows other environmental sensors, such as a moisture sensor 10, a temperature sensor 11, and pressure sensors 12, 12' on opposite faces of the substrate 2, integrated onto the same substrate 2 using well established technology. Particularly useful are the two pressure sensors 12,12' which can be used in a differential flow meter arrangement, similar to that described in U.S. Pat. No. 4,006,634.

Figure 4:
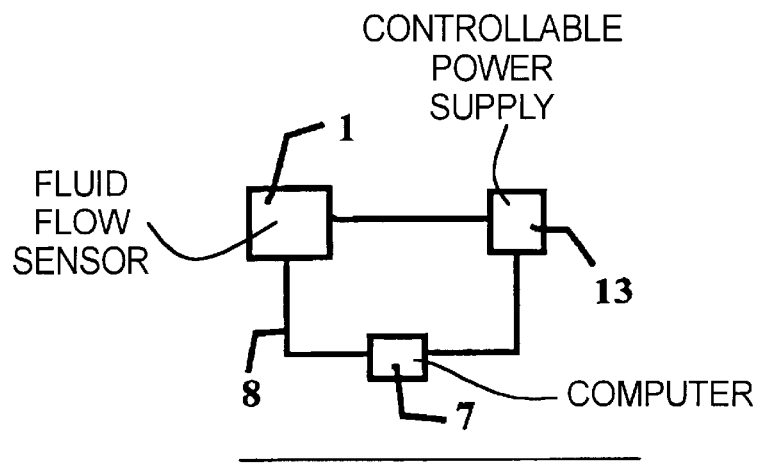
FIG. 4 shows a further embodiment of a flow meter according to the present invention.

A further embodiment of the flow meter according to the present invention is shown in FIG. 4. The sensor 1 is as shown in FIG. 1, having tines 4a . . . n as shown in FIG. 2 and therefore only the differences in the two embodiments of FIGS. 1 and 4 will be described in detail.

FIG. 4 shows a controllable power supply 13 connected between the sensor 1 and the computer 7. Again a Wheatstone bridge circuit 9 is employed similar to that shown in FIG. 3 except that one of the variable resistors, for example PS, is replaced with a resistor of known value. The piezo-resistive element 5a (being associated with R1) is, in the embodiment of FIG. 4, connected via the conductors 6a to the controllable power supply 13. In use the current that flows between the points P1 and P2 in the bridge circuit 9 as the tine flexes from its zero flow position is again monitored by the computer 7. A control signal is passed from the computer 7 to the supply 13 to vary the power output to the connected piezo-resistive element 5a in such a way that the element 5a responds to provide a force on the tine 4a which tends to move it back to its zero flow position. At this position the current flow between the points P1, P2 will return to a value which exists when no flow is present (for example zero current) and the computer 7 instructs the supply 13 to maintain its output constant. The value of the power supplied to the element 5a that is required to hold the tine 4a in its zero flow position is a measure of the fluid flow and a signal representative of this value can be supplied to the computer 7 which is programmed to calculate the fluid flow therefrom.

Although the above embodiments describe flow meters in which piezo-resistive materials are utilized it will be appreciated that piezo-electric materials may alternatively be used without departing from the inventive concept. For example, the silicon substrate 2 and integral tines 4a . . . n of the sensor 1 may be formed of a piezo-electric material such as quartz or suitable ceramics or plastics.

Although modifications and changes may be suggested by those skilled in the art, it is the intention of the inventors to embody within the patent warranted hereon all changes and modifications as reasonably and properly come within the scope of their contribution to the art.

We claim as our invention:

1. A fluid flow meter comprising:

a fluid flow path;

an obstruction disposed in said fluid flow path which is deflectable in response fluid flow in said fluid flow path, said obstruction having an electrical characteristic which varies dependent on a degree of deflection;

said obstruction comprising a plurality of flexible tines oriented in said fluid flow path so as to be individually deflected in a direction of fluid flow in said fluid flow path; and a monitor having a plurality of discrete electrical circuits respectively electrically connected to different lines in said plurality of flexible tines to monitor changes in said electrical characteristic, said monitor being configured to calculate a value of said fluid flow from said changes.

2. A fluid flow meter as claimed in claim 1 wherein said monitor includes a comparator connected to said plurality of discrete electrical circuits for comparing changes in said electrical characteristic of each tine to produce a comparison result, and for, dependent on said comparison result, utilizing the change in the electrical characteristic of at least one selected tine from among said plurality of flexible tines for calculating value of said fluid flow.

3. A fluid flow meter as claimed in claim 1 further comprising means for applying a measurable force to each tine in said plurality of flexible tines for controlling deflection of each tine to maintain the electrical characteristic of each tine at a predetermined value.

4. A fluid flow meter as claimed in claim 1 further comprising a substrate with which said plurality of flexible tines are integrated, said substrate having an aperture disposed in said fluid flow path and across which said plurality of flexible tines are disposed, said plurality of flexible tines being attached to said substrate respectively at one end only.

5. A fluid flow meter as claimed in claim 4 wherein said substrate and said tines are comprised of semiconductor material and wherein the semiconductor material forming said plurality of flexible tines is doped at least in a region opposite the end of each tine attached to said substrate, for producing said electrical characteristic which varies dependent on flexing of each tine.

6. A fluid flow meter as claimed in claim 5 further comprising means carried on said substrate for measuring a pressure difference between opposite sides of said aperture.

7. A fluid flow meter as claimed in claim 1 wherein at least some of said tines in said plurality of flexible tines have different dimensions, for imparting different flexibility, from other tines in said plurality of flexible tines.

8. A fluid flow meter as claimed in claim 1 wherein said plurality of flexible tines are comprised of piezo-resistive material.

* * * * *